United States Patent [19]
Achilleoudis et al.

[11] Patent Number: 6,052,386
[45] Date of Patent: Apr. 18, 2000

[54] TRANSMISSION SYSTEM FOR SYNCHRONOUS AND ASYNCHRONOUS DATA PORTIONS

[75] Inventors: Nicos Achilleoudis, Paris, France; Carel J. L. Van Driel, Eindhoven, Netherlands; Sabine V. Giorgi, La Vareene St. Hilaire, France; Petrus A. M. Van Grinsven, Eindhoven, Netherlands; Guillene E. Teboul, Paris, France

[73] Assignee: U.S. Philips Corporation, New York, N.Y.

[21] Appl. No.: 08/713,373

[22] Filed: Sep. 12, 1996

[30] Foreign Application Priority Data

Sep. 12, 1995 [EP] European Pat. Off. .............. 95402091

[51] Int. Cl.[7] ...................................... H04J 3/24
[52] U.S. Cl. .......................... 370/470; 370/474; 370/529
[58] Field of Search ..................................... 370/389, 395, 370/400, 401, 402, 468, 470, 471, 473, 474, 477, 498, 503, 509, 512, 516, 517, 518, 519, 522, 523, 527, 528

[56] References Cited

U.S. PATENT DOCUMENTS

| 3,862,369 | 1/1975 | Hessenmuller et al. ................ 370/301 |
| 4,353,128 | 10/1982 | Cummiskey ............................ 370/301 |
| 4,715,044 | 12/1987 | Gartner ................................. 375/222 |
| 4,823,304 | 4/1989 | Frantz et al. ...................... 395/200.62 |
| 4,914,650 | 4/1990 | Sriram ................................... 370/235 |
| 5,103,447 | 4/1992 | Takiyasu et al. ...................... 370/460 |
| 5,280,477 | 1/1994 | Trapp .................................... 370/356 |
| 5,347,540 | 9/1994 | Karrick ................................. 375/224 |
| 5,392,280 | 2/1995 | Zheng .................................. 370/353 |
| 5,521,915 | 5/1996 | Dieudonne et al. .................... 370/395 |
| 5,621,895 | 4/1997 | Weis et al. ............................ 370/407 |
| 5,638,356 | 6/1997 | Hijikata ................................ 370/395 |

Primary Examiner—Chi H. Pham
Assistant Examiner—Kwang B. Yao
Attorney, Agent, or Firm—Edward W. Goodman

[57] ABSTRACT

In a transmission system for transmitting synchronous data portions and asynchronous data portions, a transmission frame includes regularly spaced synchronous data portions interleaved with asynchronous data portions. To insure that the packing density of asynchronous data portions is optimal, the position of the synchronous data portions is allowed to deviate from its nominal value to increase the packing rate of the asynchronous data portions.

7 Claims, 6 Drawing Sheets

TRANSMISSION SYSTEM FOR SYNCHRONOUS AND ASYNCHRONOUS DATA PORTIONS

BACKGROUND OF THE INVENTION

1. Field of the Invention

The invention is related to a transmission system having at least one transmitter coupled to at least one receiver. The transmitter includes frame assembly means for assembling frames from synchronous data portions and asynchronous data portions, and transmitting means for transmitting the frames to at least one receiver.

The invention is also related to a transmitter, a receiver, a transmitting method and a signal to be used in the above mentioned transmission system.

2. Description of the Related Art

Such a transmission system is known from U.S. Pat. No. 4,914,650.

In the future, communication systems may converge to a single network by which all subscribers are interconnected. Such a network must be suitable for transmission of signals required for various applications, such as telephony, digital TV, and data communication. All these applications require different types of services from the network. Telephony requires a low delay low bit-rate connection. Digital TV transmission requires a substantial higher bit rate but tolerates a larger delay. Data traffic is generally quite bursty and has delay requirements strongly dependent on the type of user application for which it is used.

In order to deal with all these requirements, the transmission system known from the above-mentioned U.S. patent, is arranged for transmitting a signal having fixed positions reserved for synchronous data portions. The remaining space in the signal is available for asynchronous data portions, which are often constituted by a plurality of packets, such as an ATM cells having a 5-byte header and a 48-byte payload area. In the prior art system, an integer number of packets had to be placed between two subsequent synchronous data portion, which can result in some unused space.

SUMMARY OF THE INVENTION

It is an object of the present invention to provide a transmission system according to the opening paragraph, in which the amount of unused space in the transmitted signal is reduced.

Therefore, the transmission system according to the invention, is characterized in that the frame assembling means are arranged to insert the synchronous data at positions differing from their nominal positions, in order to increase the efficiency of placing the asynchronous data in the frames.

By allowing the positions of the synchronous data portions to be different from their nominal positions, the amount of unused space can be reduced. The positions of the synchronous data portions are chosen in an adaptive way to minimize the unusual space. In order to inform the receiver about the positions of the synchronous data portion, an indication of their positions can be transmitted at the beginning of a frame. Alternatively, it is possible to provide the synchronous data portions with an identifier allowing the receiver to recognize them.

An embodiment of the invention is characterized in that the frames comprises a plurality of elementary data cells, in that the synchronous data portions are carried by a first integer number of elementary data cells, and in that the asynchronous data portions are carried by a second integer number of elementary data cells.

By splitting the asynchronous data portions into an integer number of elementary data cells, it becomes possible to decrease the unused space portions even more, because now, the asynchronous data portions can be broken up to allow the transmission of a synchronous data portion in between.

BRIEF DESCRIPTION OF THE DRAWINGS

The invention will now be explained in more detail with reference to the drawings, in which.

DESCRIPTION OF THE PREFERRED EMBODIMENTS

Figure 1:
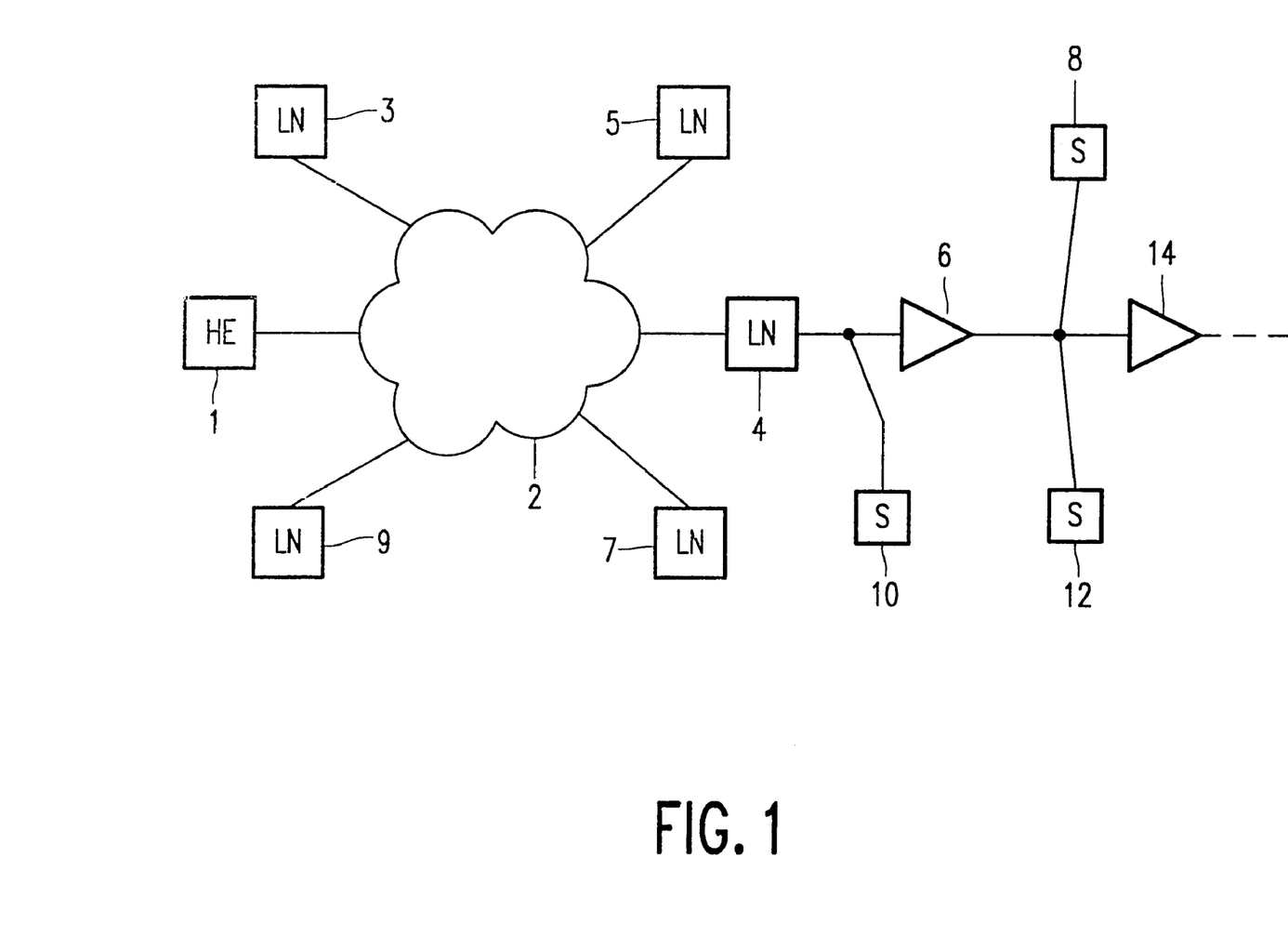
FIG. 1 shows an embodiment of a telecommunication network in which the invention can be applied.

A CATV system is shown in FIG. 1 and uses a hybrid fiber coax architecture, which basically includes a head-end 1, a trunk network (often using optical fiber), a plurality of local nodes 3, 5, 7, 9, a feeder network (coaxial cable) and the drop network. The trunk network often uses optical transmission technology, but the present invention is not limited thereto. The trunk network 2 connects the head-end 1 with the local nodes 3, 4, 5, 7 and 9. The feeder network connects the local nodes with end-amplifiers 6, 14, and the drop network connects the end-amplifiers 6, 14 to the subscribers 8, 10, 12. Currently, an average 500 subscribers are served by one local node. It is clear that in the near future, even fewer subscribers will be served by the same local node. The number of subscribers per local node decreases approximately a factor of two each year. The amplifiers in the feeder network are two-way amplifiers, with a return channel that is shared among the subscribers.

The network described above is a tree-and-branch topology and, therefore, will always have single points in the root of the tree (e.g., the head-end) as shown in FIG. 1. This means that the central point can also be used for processing the protocols centrally instead of in a distributed way.

This simple observation has important consequences for the system. The main advantage of this approach, however, is the increased flexibility of the system. In the network described above, the nodes in the network have to signal to the central point that they want some bandwidth, but the consequent processing of these requests and the allocation of bandwidth to a node is done centrally. Hence, the terminals only have to know how the requests are transmitted and not how to deal with the requests. In this concept, the Network Interface Units (NIU's) are slaved from the Network Access Control Node (NACoN). Most protocols, such as the MAC protocol for obtaining access to the transmission medium, can be implemented if the framing is properly defined. Using this approach, it is necessary to define the frame structure, but it is not necessary to define the protocol in the same way as it is traditionally done for LAN or MAN networks. This document describes the frame structure and the functionalities that are necessary for standardization, so that an open system is defined that can be installed on operational and future networks. It can support a variety of MAC protocols so that, depending on the class of services that the operator wants to offer, an optimal MAC protocol can be chosen.

Figure 2:
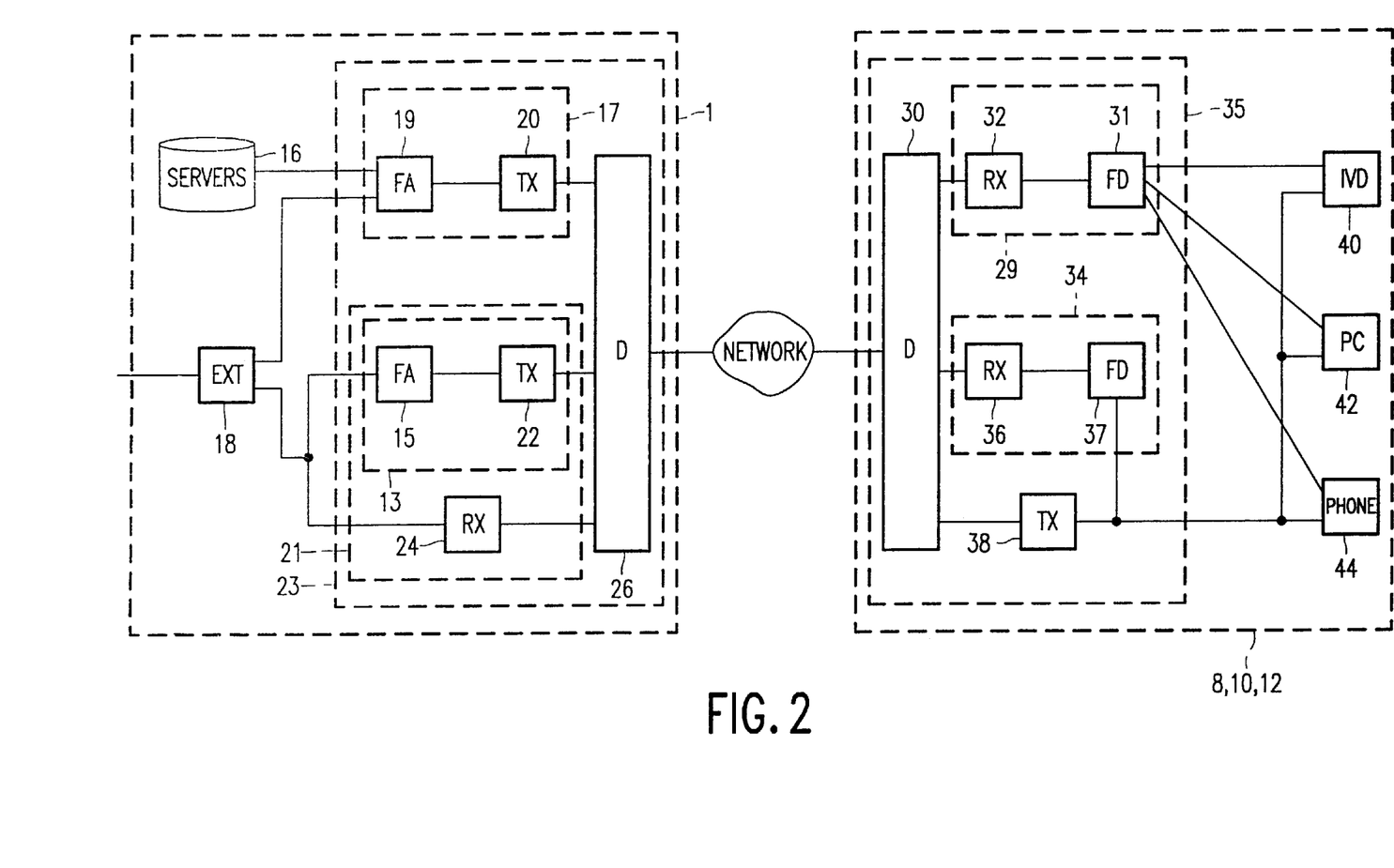
FIG. 2 shows the interconnection between the head end 1 and a subscriber station 8, 10, 12.

The head-end, according to FIG. 2, includes servers 16 which are connected to a transmitter 17, which has a frame assembler 19 and transmitting means 20. In the present system, separate downstream channels are used for medium-speed and high-speed data. It is, however, possible that the high-speed and medium-speed data are multiplexed for transmission. The head-end 1 can be separated into two parts. The first part is the High-Speed Unidirectional part intended for broadcast. It includes the transmitter 17, with a frame assembler 19 and transmitting means 20, also called a Broadcast Network Access Control Node (BNACoN), in the head-end 1, and a receiver 29 at the subscriber's premise. The receiver 29, with receiving means 32 and a frame disassembler 31, are called a Broadcast Network Interface Unit (BNIU). This first part is unidirectional and uses high-speed modulation, up to around 40 Mbit/s.

The second part is the Medium-Speed Bi-directional part. This includes the transmitter 13, with frame assembling means 15 and transmitting means 22, and the receiver 24 in the head-end 1. The combination of the transmitter 22 and the receiver 24 constitute an Interactive Network Access Control Node 21 (INACoN). The subscriber station 8 comprises an Interactive Network Interface Unit 34 (INIU). It has symmetric bi-directional capabilities, up to a few Mbit/s, due to the presence of the transmitter 38 and the receiver 34, with receiving means 36 and frame disassembling means 37. Most of the symmetric telecommunications connections (e.g., telephony, videophony and videoconferencing), as well as interactive control and computer traffic, pass through this part. The data passes over the local access communications system over to the subscribers home, where various home appliances can be connected for their communication needs. Examples of such appliances include an Interactive Video Decoder 40, a personal computer 42 or a telephone 44. Again, these appliances can either pass through a single central node, as shown, or even use separate modems for each apparatus, before in-house wiring integration takes off.

In order to be able to transmit and receive all these different kinds of signals over a single physical medium, the head-end 1 comprises a duplexer 26, and the subscriber station 8 comprises a duplexer 30.

As described in the introduction, the network has to deal with different traffic types depending on the applications supported. The net bit-rates of the system are 1.544 Mbit/s or 2.048 Mbit/s (T1/E1, respectively) in order to support STM services like, e.g., telephony as well as ATM services, e.g., data communication or control information for video-on-demand services. A 256 kbit/s fall-back bit-rate is also possible for cases in which the channel is excessively bad.

A possible modulator/demodulator design that is used in the transmit means 20 will be based on differential QPSK modulation with an efficiency of about 1.5 bits/s/Hz. The downstream transmission will be continuous, while the upstream will be in bursts. Due to the lay out of an hybrid fiber coax network (tree-and-branch network) where the loop length and attenuation between subscriber and head-end differ per subscriber, both time ranging, power ranging and some kind of medium access protocol have to be implemented to facilitate efficient and reliable communication via the upstream channel.

The quality of the return path is lower than that of the broadcast path. Therefore, the modulation used by the transmitter 38 for the return path is a differential QPSK. The shaping filter is a Nyquist filter with a roll-off of 35%. The downstream path uses QPSK with a DVB-like scrambling. Basically, in both directions, the raw bit-rate is either 1.737 Mb/s or 2.304 Mb/s to support T1/E1, respectively. Considering, the asymmetric transmission due to the 2-way electronic amplifiers with a narrow band for the return path and a large band for the broadcast path, the frequency ranges that might be encountered. The exact frequency range to be supported is 5–65 MHz for the upstream direction, and 47–860 MHz for the downstream direction. For systems up to around 2.5 Mbit/s, the channel is sufficiently flat, so that no equalization is needed. For higher bit-rates, some equalization might be necessary. In this case, an additional equalization step might need to be performed at initialization. The variation in power is assumed to be less than 40 dB in the upstream direction.

Figure 3:
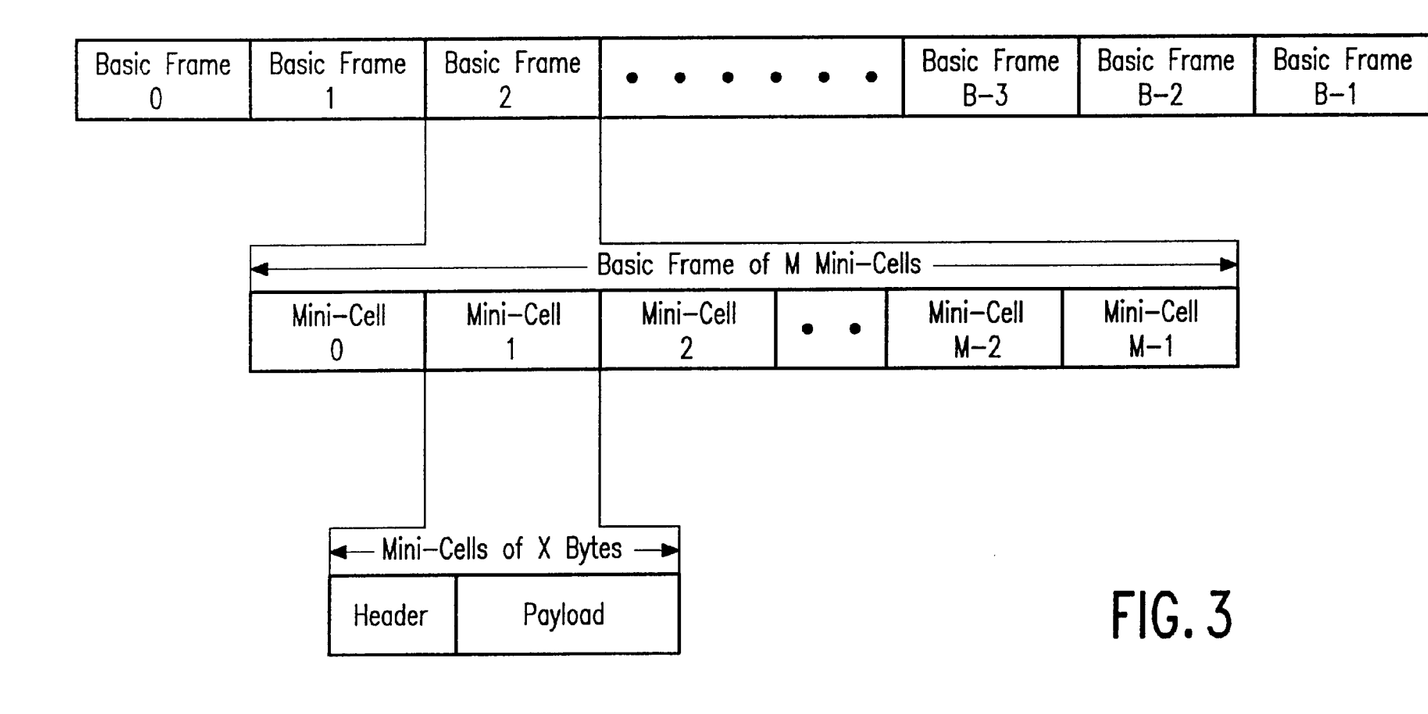
FIG. 3 shows the hierarchical construction of the frames used in the present invention.

In FIG. 3, a general lay out of the frame structure is shown. It is assumed that the general frame structure is similar in the upstream and downstream directions. At the bottom of the frame hierarchy, we have the so-called mini-cells, which are built up from X bytes. A cluster of M mini-cells forms a basic frame (BF). At the top of the frame structure, we have the so-called multi-frames. A multi-frame contains B basic frames.

Figure 4:
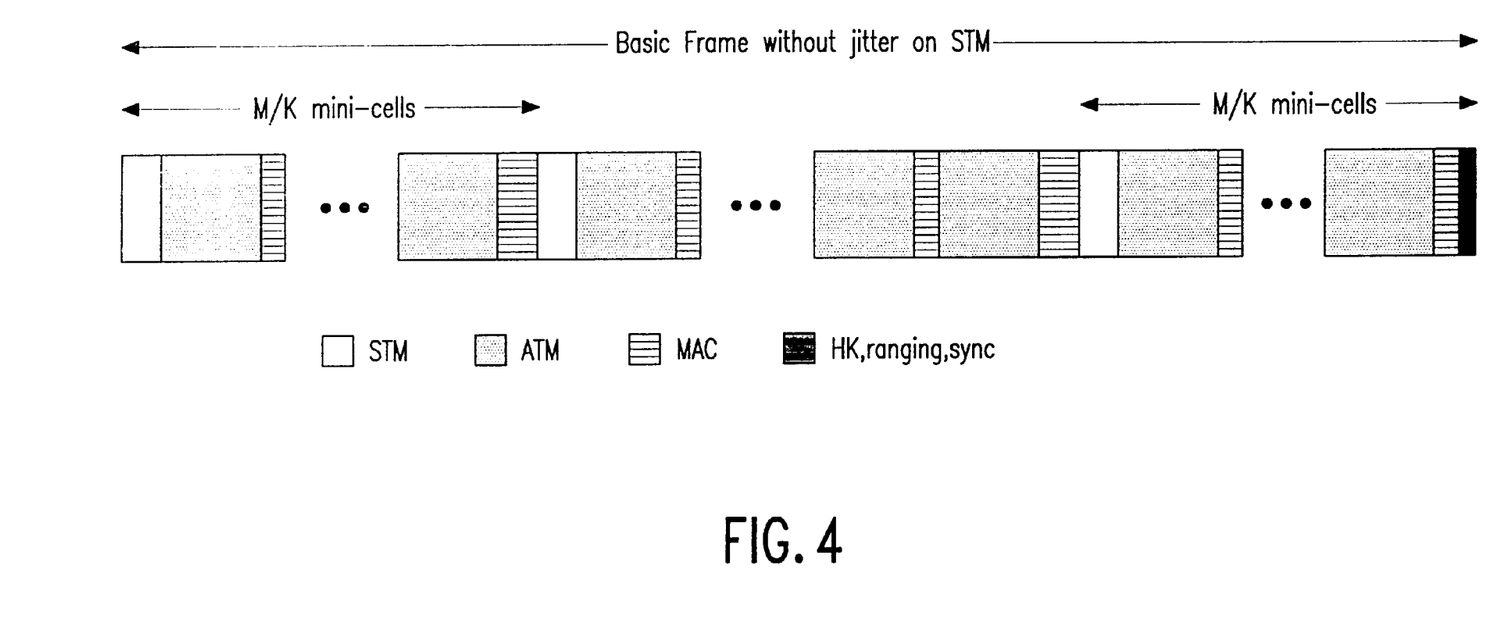
FIG. 4 shows a frame structure according to the prior art transmission system.

In FIG. 4, it is shown how two different classes of data, i.e., system data and payload data, can be carried in one basic frame. Within each class, there is, again, a subdivision in cell types. In the system data, we find mini-cells for synchronization, ranging, housekeeping and MAC-protocol. In the payload class, we distinguish mini-cells for Synchronous Transfer Mode (STM) services and mini-cells for all other sorts of services. These other services will all be based on Asynchronous Transfer Mode (ATM). Since, in general, an ATM-cell is larger than a mini-cell, an ATM-cell will be mapped into a train of consecutive mini-cells. The distribution of the various cell types can differ per basic frame and is fully controlled by the head-end. The amount of mini-cells allocated for housekeeping, ranging, MAC-layer and payload is adapted to the actual needs, and can even be zero for some cell types. Therefore, the frame structure must not be seen as a rigid structure, but more as a virtual structure to facilitate an easy implementation of multiple services. There is a correspondence, however, between the downstream and the upstream structures. A multi-frame with a repetition rate of B basic frames makes it easier to "address" a specific basic frame. This addressing facilitates implementation of, for instance, ranging, very low bit-rate STM services, and a flexible use of MAC cells in relation to delay requirements.

Figure 5:
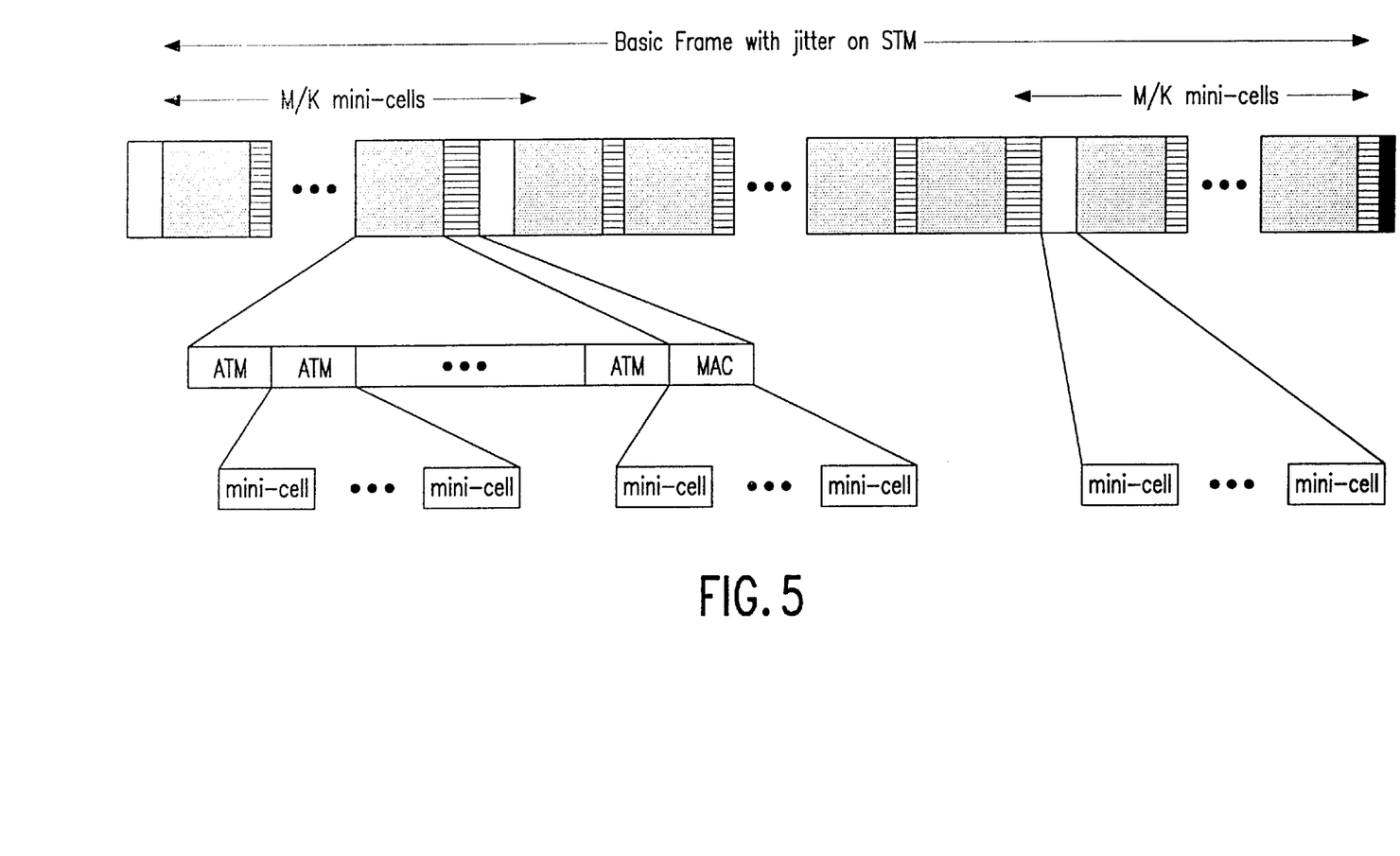
FIG. 5 shows a frame structure according to the present invention.

The system can operate in two modes, i.e., a mode where there is no jitter on the STM data, as is shown in FIG. 4, and a mode where a certain amount of jitter on STM data is allowed, as is shown in FIG. 5. The latter mode allows a more efficient mapping of mini-cells for other, non-STM services within a basic frame. In the no-jitter mode, it is possible that for a certain STM capacity, an integer number of ATM cells may not fit in the remaining interval between two successive STM blocks. This will cost a certain amount of ATM-bandwidth. By allowing an amount of jitter on the position of the STM-cells in the frame, we can pack the frame as tightly as possible.

The general frame structure can be described with a few parameters:

M Number of mini-cells per basic frame;
K Number of STM blocks per basic frame (M/K must be a integer);
$M_{ATM}$ Number of mini-cells used to store an ATM-cell;
$N_{ATM}$ Number of ATM-cells per cluster;
$M_{MAC}$ Number of mini-cells for MAC per cluster;
$M_{Sys}$ Number of mini-cells for system purposes (HK, ranging, sync) per basic frame;
$M_{STM}$ Number of mini-cells per STM block;
Mode Operation mode: no jitter on STM/jitter allowed on STM; and
delta The maximum extra delay in mini-cells of an STM block in jitter mode compared to the corresponding STM block in the no-jitter mode. This parameter is only meaningful if jitter is allowed on STM. If delta is made equal to 0, the no-jitter mode is obtained.

In general, the downstream basic frames will start with a STM data block followed by a number of ATM/MAC-clusters. An ATM/MAC-cluster is a cluster of $M_{clus}$ mini-cells formed by $M_{ATM}$ $N_{ATM}$ mini-cells containing $N_{ATM}$ ATM-cells followed by $M_{MAC}$ mini-cells with MAC information. This pattern is repeated up to the end of the basic frame. The MAC part is used to broadcast mini-cell allocation information for upstream traffic to all subscribers, and possible commands for collision resolution algorithms. The downstream basic frames will end with the system data, such as sync words and housekeeping. Sync information is present at regular intervals in a multi-frame, so not necessarily in every basic frame. Housekeeping contains all physical layer data (ranging offsets, power settings, alarms, etc.) to keep the system running. The total amount of ATM/MAC clusters per basic frame in the no-jitter mode is equal to:

$$C_{cluster} = (K-1) \cdot \left\lfloor \frac{M/K - M_{STM}}{M_{ATM} \cdot N_{ATM} + M_{MAC}} \right\rfloor + \left\lfloor \frac{M/K - M_{sys} - M_{STM}}{M_{ATM} \cdot N_{ATM} + M_{MAC}} \right\rfloor \quad 1$$

It goes without saying that $M/k - M_{sys} - M_{STM}$ is larger or equal to 0, because, otherwise, the system mini-cells and the STM mini-cells would not fit into the STM block. In this (no-jitter) mode, there are K almost identical sub-frames in a basic frame. Each sub-frame starts with a STM block of $M_{STM}$ mini-cells, followed by $C_{cluster}$ ATM/MAC-clusters. The remaining mini-cells in the sub-frames are used for MAC, except for the last sub-frame where also a part is used for system purposes (HK, ranging, etc.).

In the jitter mode, the amount of ATM/MAC-clusters per basic frame is equal to:

$$C_{cluster} = \left\lfloor \frac{M - M_{sys} - K \cdot M_{STM}}{M_{ATM} \cdot N_{ATM} + M_{MAC}} \right\rfloor \quad 2$$

In the jitter mode, a basic frame starts with an STM block. This block is followed by $C_{cluster}$ ATM/MAC-clusters. However, at intervals of about M/K mini-cells, an STM block is put in between. The STM blocks can be placed within a ATM/MAC-cluster, but only at boundaries of ATM-packets. The STM blocks are positioned such that there is a maximum jitter compared with the start of a basic frame of $\pm \lfloor M_{ATM}/2 \rfloor$ mini-cells. The basic frame ends with the system data.

This approach requires that either every mini-cell contains, in its header, a cell-type identifier, or that a certain number of mini-cells contain information concerning the mapping of cell types per frame.

The frame structures for both the upstream and downstream directions are similar. The cell mapping for an upstream frame is broadcast to all subscribers such that all subscribers know which mini-cells they may use, and for which purpose. If there are some mini-cell locations not allocated due to improper spacing, they will be used for ATM or MAC.

The upstream frame needs no sync information but can have some space reserved for ranging purposes. Furthermore, there can be mini-cells allocated for housekeeping which can be used, in this case, for acknowledgments of received housekeeping commands, monitoring functions, alarms, etc. A part of the frame is reserved for the MAC layer, i.e., space where requests for bandwidth can be placed. The remaining part of a frame can be used for payload of various services. Again, like in the downstream direction, the amount of mini-cells allocated for a certain functionality can differ per basic frame and might be zero for some cell types.

Figure 6:
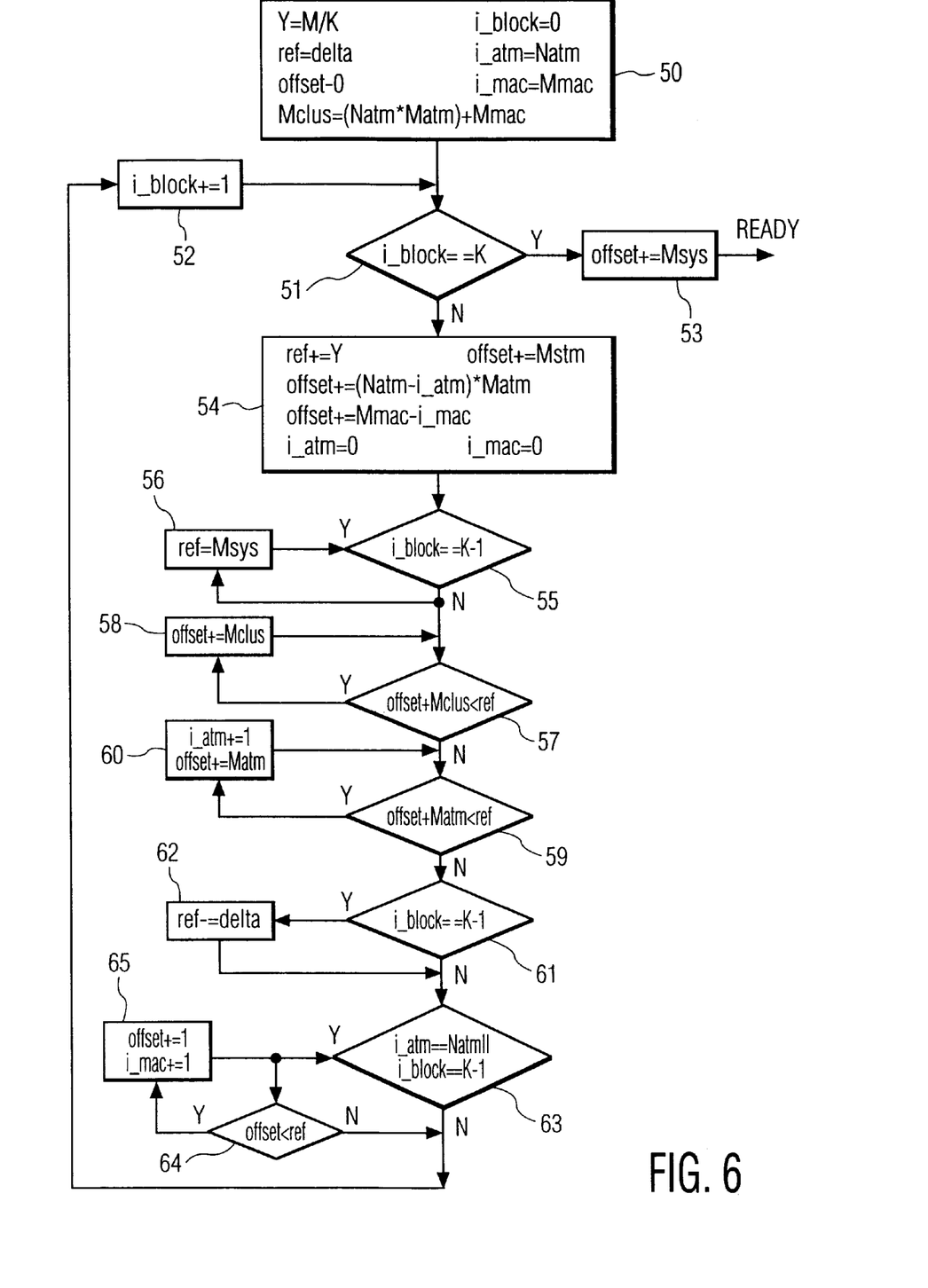
FIG. 6 shows a flowchart of a program to be used in the processor in the transmitter according to FIG. 2.

The flowchart according to FIG. 6 represents a program intended to run on a programmable processor in order to realize the frame assembling means. The flowchart according to FIG. 6 describes one of the possible algorithms using jitter and no-jitter modes for mapping different cell types in a basic frame.

First, some of the parameters used in the flowchart have the following meaning:

Y=M/K: the number of mini-cells between two successive STM blocks in an ideal no-jitter case.

ref: the ultimate start position of the next STM block. This ultimate start position is expressed in the number of mini-cells from the beginning of the frame.

offset: start position of a new cluster of cells of a certain type, e.g., start of STM block, start of ATM cluster, start of ATM-cells, start of MAC cells or start of HK-cells. Again, this start point is expressed in a number of mini-cells from the beginning of the frame.

i_block: counter, 0, 1, . . . , K-1. This counter indicates the number of the actual STM block.

i_atm: number of ATM cells of a split ATM cluster which are placed before the next STM block.

i_mac: number of MAC cells of a split ATM cluster which are placed before the next STM block.

A frame starts with a STM block. In instruction 50, a number of variables are initialized. The ultimate start position for the next STM block is calculated with the parameter ref. This parameter is initialized with delta, (delta >=0), indicating the maximum delay (in mini-cells) that is allowed compared with an ideal no-jitter situation. In instruction 50, the variable i_block is set to 0 to indicate the beginning of the frame. The variables i_atm and i_mac are set to $N_{ATM}$ and $N_{MAC}$ to indicate that, in principle, all ATM blocks and MAC blocks are to be placed before the next STM block. Finally, in instruction 50, the number $M_{clus}$ of mini-cells in an ATM/MAC cluster is calculated.

In instruction 51, the value of the counter i_block is compared with K. If i_block is equal to K, the construction of the present frame is finished, and the program is terminated by the execution of the instruction 53.

Every time a new STM block is placed, "ref" is incremented with "Y=M/K" in instruction 54. The parameter "offset" is first incremented with the size of an STM block "$M_{STM}$" in instruction 54. Then it is incremented with the remaining number of ATM-cells (($N_{ATM-i}$_atm)*$M_{ATM}$)

and remaining MAC cells ($M_{MAC-i13}$ mac) from a split ATM cluster. In instruction 55, it is checked whether current block is the final block of a frame. If this is the case, the variable "ref" is decreased with $M_{Sys}$ in order to make space available for the system information (HK, ranging, sync., in FIGS. 4 and 5).

Next, the algorithm fits in as many ATM/MAC clusters as possible (determined by the value of "ref"). It increments, in instruction 58, the parameter "offset" with $M_{clus}$ until no complete new ATM/MAC-cluster fits in (offset+$M_{clus}$<ref; checked in instruction 57). The next ATM/MAC cluster is split. First, the program tries to place as many ATM cells from this cluster as possible. This is done in the instructions 59 and 60. In instruction 59, it is checked whether there is space for another ATM cell by comparing "offset+$M_{ATM}$" with "ref". In the case all ATM cells could be placed, the remaining gap is filled with as many MAC cells as possible. Then it places the STM block, and the whole procedure is repeated.

In instruction 61, it is checked whether the last segment of a frame is to be placed. If this is the case, the parameter "ref" is decremented with "delta" in instruction 62, and at the termination of the program, in instruction 53, the variable "offset" is incremented with "$M_{Sys}$". The reason for these instructions is that a frame has to end properly and that in the last segment of a frame, also the HK-cells are placed.

In instruction 63, it is checked whether all ATM cells of the current ATM/MAC cluster are placed, or whether the final block has been reached. In both cases, the remaining space is filled with as many MAC cells as possible. This is done in the instructions 64 and 65. In instruction 64, it is checked whether there is still space available, by comparing the variable "offset" with the variable "ref". If there is still space available ("offset"<"ref"), the next MAC cell is placed, and the variables "offset" and "i_mac" are incremented. Finally, the counter i_lock is increased by 1, and the program is continued at instruction 51.

What is claimed is:

1. A transmission system comprising at least one transmitter coupled to at least one receiver, said transmitter comprising:

frame assembling means for assembling frames from synchronous data portions and asynchronous data portions, each data portion comprising an integer number of elementary data cells; and transmitting means for transmitting the frames to at least one receiver, said frame assembling means being arranged to attach a cell-type identifier to each elementary data cell, the cell-type identifier identifying the cell as synchronous or asynchronous, the frame assembling means further being arranged to insert synchronous data at positions differing from their nominal positions to increase the efficiency of placing asynchronous data in the frame.

2. A transmitter comprising:

frame assembly means for assembling frames from synchronous data portions and asynchronous data portions, each data portion comprising an integer number of elementary data cells; and transmitting means for transmitting the frames, said frame assembly means being arranged to attach a cell-type identifier to each elementary data cell, the cell-type identifier identifying the cell as synchronous or asynchronous, the frame assembling means further being arranged to insert synchronous data at positions differing from their nominal positions to increase the efficiency of placing asynchronous data in the frame.

3. A receiver comprising:

means for receiving frames comprising synchronous data portions and asynchronous data portions, each data portion comprising an integer number of elementary data cells, each elementary data cell having an attached cell-type identifier that identifies the cell as synchronous or asynchronous; and frame disassembling means that uses each cell-type identifier to retrieve synchronous data from positions in a frame differing from their nominal positions.

4. A transmission method comprising the steps of:

(a) assembling frames from synchronous data portions and asynchronous data portions, each data portion comprising an integer number of elementary data cells;

(b) attaching a cell-type identifier to each elementary data cell, the cell-type identifier identifying the cell as synchronous or asynchronous;

(c) inserting the synchronous data portions at positions differing from their nominal positions to increase the efficiency of placing the asynchronous data portions in the frames; and (d) transmitting the frames to at least one receiver.

5. A method comprising the steps of:

(a) receiving frames comprised of synchronous and asynchronous data portions, each data portion comprising an integer number of elementary data cells, each elementary data cell having an attached cell-type identifier that identifies the cell as a synchronous or asynchronous data cell; and (b) retrieving synchronous data from positions in the frame differing from their nominal positions by using each attached cell-type identifier to identify said synchronous data.

6. A transmitter comprising:

frame assembling means for assembling frames from synchronous data portions and asynchronous data portions, each data portion comprising an integer number of elementary data cells; and transmitting means for transmitting the frames to at least one receiver, said frame assembling means being arranged to attach a cell-type identifier to each synchronous elementary data cell, thereby identifying the cell as synchronous.

7. A receiver comprising:

means for receiving frames comprising synchronous data portions and asynchronous data portions, each data portion comprising an integer number of elementary data cells, each synchronous elementary data cell having an attached cell-type identifier that identifies the cell as synchronous; and frame disassembling means, said frame disassembling means using each cell-type identifier to retrieve synchronous data, said frame disassembling means further using each cell's lack of a cell-type identifier to retrieve asynchronous data.

* * * * *